June 10, 1952  L. F. MALLASCH  2,599,929
WIRE PULLING DEVICE
Filed April 17, 1950
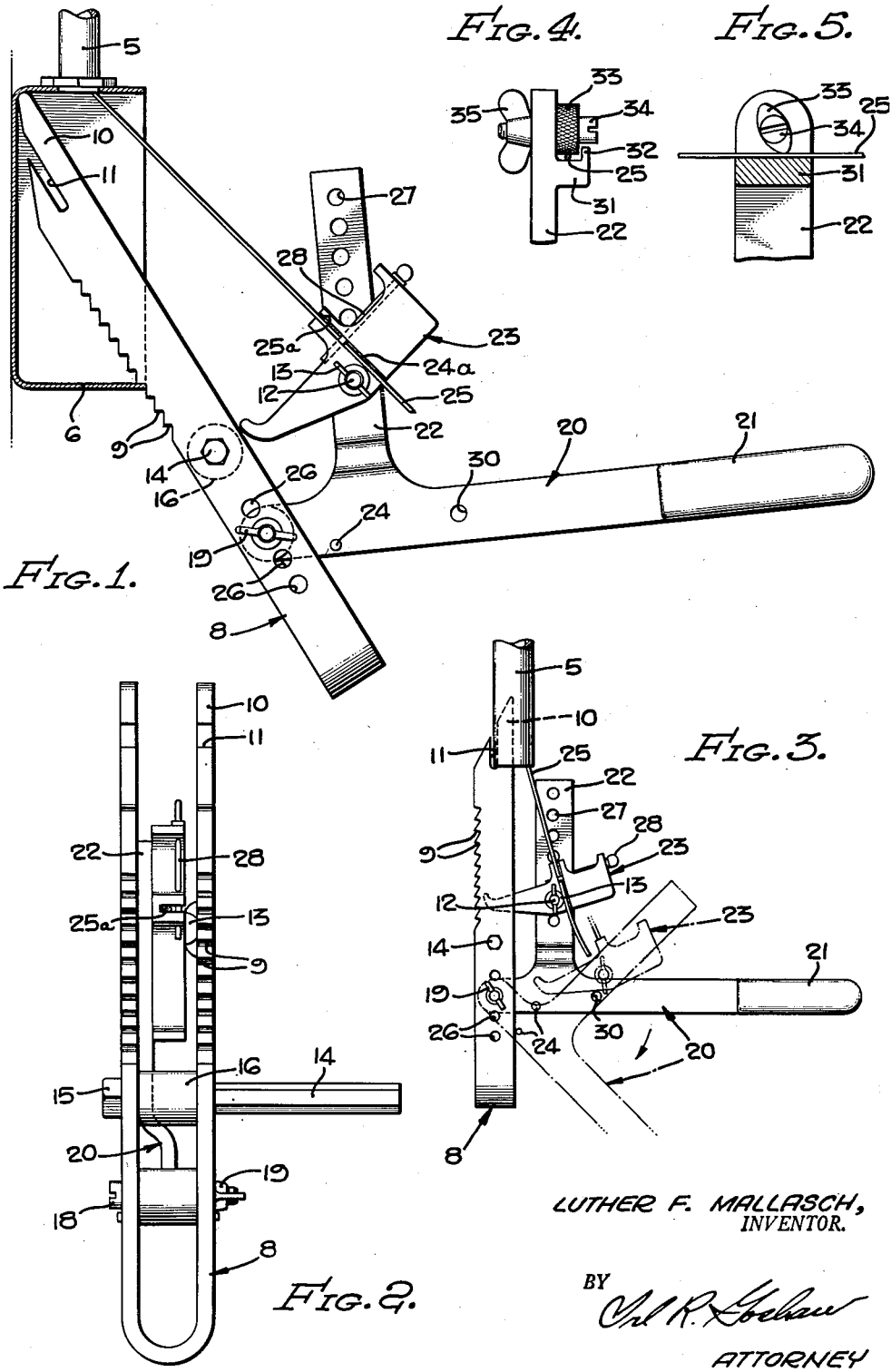
LUTHER F. MALLASCH,
INVENTOR.
BY
ATTORNEY Patented June 10, 1952

2,599,929

UNITED STATES PATENT OFFICE 2,599,929

WIREPULLING DEVICE

Luther F. Mallasch, Glendale, Calif.

Application April 17, 1950, Serial No. 156,310

5 Claims. (Cl. 175—376)

This invention relates to wire pulling devices, and particularly to a device for pulling electrical wires through conduit pipes and the like.

It is well-known, in the electrical art, that devices commonly known as "come-a-longs" are used for pulling a wire leader or snake, to which are attached electrical wires, through a conduit, the electrical wires eventually remaining in the conduit. That is, the steel lead wire is forced through the conduit from the entrance end, and, after it emerges at a conduit terminal box, the electrical wires are attached to the lead wire at the entrance end of the conduit. The come-a-long unit is then attached to the lead wire so the electrician can get a better grip on the wire and exert a greater pulling force than is possible by hand. The come-a-long has an overrunning clutch or ratchet mechanism which permits its being slid along the wire to the exit end of the conduit, where it locks to the wire when moved in the opposite direction. Many times, however, when several wires are placed in a long conduit, insufficient pulling force can be applied to the lead wire to pull the electrical wires through the conduit.

The present invention is directed to a lead wire pulling unit which is attachable and automatically adjustable to any size of conduit terminal box and is also attachable to a conduit itself. It permits the obtaining of a greater pulling force than heretofore obtainable, and a more rapid application of the force. The device utilizes a main frame member which adjusts itself to different size terminal boxes, outlet, or to the conduit. It is lever-operated with a pumping action, and various pulling ratios are obtainable.

The principal object of the invention, therefore, is to facilitate the pulling of wires through conduits.

Another object of the invention is to provide an improved wire pulling device for lead wires of electrical wires.

A further object of the invention is to provide an electrical lead wire pulling device attachable to conduits themselves or to conduit terminal boxes of different sizes, to which it is automatically adjustable.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a side elevation of the invention in operating position in a conduit terminal box.

Fig. 2 is an end view of the device shown in Fig. 1.

Fig. 3 shows the device in operation in an open-ended conduit.

Fig. 4 is a detail view showing another feature of the device, and

Fig. 5 is a front view of the feature shown in Fig. 4.

Referring now to the drawings, in which the same numerals identify like elements, an electrical conduit 5 is shown terminating in a terminal box 6 of a certain commercial size. The device is shown with its frame member 8 inserted in and attached to the box, the member 8 being a U-shaped element with corrugated or saw-toothed, notched edges 9 and a tapered tip 10 with a slot 11 therein. The series of notches 9 permits the device to automatically fit terminal boxes of different sizes by having the tip 10 abut the inner, upper corner, and one of the notches abut the lower, outer corner, the device thus being held therein while in use. Although the frame 8 is shown as a U-shaped single piece, it may be of two strips bolted together at one end, or it could be of a single member of greater width. If these forms are provided with the proper taper, teeth, and slot, they will function satisfactorily.

The device is provided with a holding handle 14, which is bolted to the frame 8 by a nut 15, the frame members being held in definite separated positions by the collar 16 when the nut 15 is tightened. Pivoted between the sides of U frame 8 on a bolt 18 having a hand nut 19, is an actuating handle 20 having a round handle portion 21 and a right-angled pulling portion 22. A stop pin 24 is attached to the handle to stop the lever at a definite position when the stop pin contacts the frame 8. Several holes 26 are provided in the frame 8 to position the pivoted end of the lever 20 at different points on the frame. In one of several holes 27 in the end of arm 22, there is bolted, by a bolt 12 with a wing nut 13, a come-a-long 23 of any well-known commercial type. This come-a-long has a roller 24a therein adapted to grip the lead wire 25 when the come-a-long is pulled to the right in Fig. 1, and which will permit the come-a-long to slide along the wire when moved to the left. To maintain the wire 25 in the groove 25a of the come-a-long, a pin 28 passes through holes in the come-a-long so that the wire will not move sidewise and be removed from the notch 25a during operation.

To operate the device in a terminal box, it is positioned as shown in Fig. 1, the pin 28 lifted, and the wire inserted in the notch 25a, the pin replaced, and then, by a pumping action on the handle 20, the wire is pulled through the conduit 5. Therefore, not only can a greater pulling force be exerted on the wire 25 than when the come-a-long 23 is held in the hand, but a more rapid pulling action can be applied. It is obvious that the handle 21 could be made as long as desired with respect to the arm 22, so that any desired amount of pulling force may be obtained.

In Fig. 3, the puller is shown pulling wire through an open ended conduit, the solid lines showing the starting position of the handle 20, and the dotted lines showing the terminating position thereof. In some instances, in order to obtain a more direct pull on the wire 25 with respect to the axis of the conduit 5, the come-a-long 23 may be attached to the arm 20 in the hole 30. The cantilever leverage is obtained by the ratio between the distance from the hole 30 to the pivot of the handle and the length of the handle.

The invention is shown using a commercial type of come-a-long 23. However, a more simple unit, which eliminates the finger grips, may be formed on the end of the arm 22, such as shown in Figs. 4 and 5. In this instance, the arm 22 has a shoulder portion 31 with an extending flange 32 to form a notch for the wire 25 and over which is a knurled elliptical dog 33, rotatable on a bolt 34, held in position by a wing nut 35. In this instance, the wire 25 is gripped by the dog 33 when the arm 22 is moved to the right, while the wire 25 can move freely along the arm when moved in the opposite direction.

I claim:

1. A device for pulling a wire through conduit pipes having terminal boxes at the ends thereof, comprising a straight longitudinal frame member having one end tapered to contact the inside corner of a terminal box and one side notched to contact the opposite lower edge of said box and maintain said tapered end in contact with said inside corner of said box, a wire pulling handle having one end pivoted on said member, said handle extending from the side of said member opposite to the side having said notches thereon, and a wire holding element on said handle, said element holding said wire thereto when said handle is moved in one direction and said element moving along said wire when said handle is moved in the opposite direction.

2. A device in accordance with claim 1, in which said tapered end of said member is slotted to permit attachment of said member to the wall of a conduit pipe and a holding handle is provided for said member.

3. A wire pulling device comprising a frame, said frame including a straight longitudinal member having a tapered end, a hand-pulled lever having one end thereof pivotally mounted near one end of said member and movable in substantially the same plane in which said member is positioned, said member having a plurality of notches extending along the edge thereof on the opposite side from said lever, and an overrunning clutch on said lever for attachment to a wire to be pulled, said tapered end of said member being slotted for accommodating the walls of a conduit pipe when said device is attached thereto, said member having a holding handle extending at right angles thereto and to said lever.

4. A wire puller comprising a U-shaped longitudinal frame member having an open end and a closed end, the tips of the open end being tapered, toothed edges being provided on one side of said member, a lever pivoted adjacent the closed end of said frame member and extending outwardly on the side of said frame member opposite said toothed edges, and a wire fastening element on said lever, said element holding a wire when moved in one direction and releasing said wire when moved in the opposite direction, said lever having a right angle extension therefrom to which said wire holding element is adjustably mounted, said wire holding element being detachable from said extension and having a hand graspable element to permit said wire to be pulled by hand when said wire holding element is detached from said extension.

5. A wire puller comprising a U-shaped longitudinal frame member having an open end and a closed end, the tips of the open end being tapered, toothed edges being provided on one side of said member, a lever pivoted adjacent the closed end of said frame member and extending outwardly on the side of said frame member opposite said toothed edges, and a wire fastening element on said lever, said element holding a wire when moved in one direction and releasing said wire when moved in the opposite direction, a longitudinal slot being provided in at least one of the tips of the open end of said frame member for attaching said frame member to the end of a pipe, together with a holding handle attached to said frame member and extending at right angles from the planes of said frame member and lever.

LUTHER F. MALLASCH.

REFERENCES CITED

The following references are of record in the file of this patent:

UNITED STATES PATENTS

| Number | Name | Date |
|---|---|---|
| 966,799 | Crawford | Aug. 9, 1910 |
| 1,543,661 | Baumback | June 30, 1925 |
| 1,865,113 | Kiesel | June 28, 1932 |
| 2,394,313 | Krummel | Feb. 5, 1946 |

FOREIGN PATENTS

| Number | Country | Date |
|---|---|---|
| 163,424 | Great Britain | May 10, 1921 |